Oct. 14, 1930.  H. E. KEMPTON ET AL  1,778,601
LOADING DEVICE FOR WORK HOLDERS
Filed Nov. 16, 1925   2 Sheets-Sheet 1

Inventors
Herbert E. Kempton
Keith F. Gallimore
By Chindahl, Parker & Carlson
Attys.

Oct. 14, 1930.  H. E. KEMPTON ET AL  1,778,601
LOADING DEVICE FOR WORK HOLDERS
Filed Nov. 16, 1925  2 Sheets-Sheet 2

Inventors
Herbert E. Kempton
Keith F. Gallimore
Attys.

Patented Oct. 14, 1930

1,778,601

UNITED STATES PATENT OFFICE

HERBERT E. KEMPTON AND KEITH F. GALLIMORE, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS

LOADING DEVICE FOR WORK HOLDERS

Application filed November 16, 1925. Serial No. 69,361.

The present invention relates to a novel apparatus for facilitating the loading of work blanks into workholders, and has reference more particularly to a loading fixture for portable workholders or shuttles of the general type disclosed in our copending application, Serial No. 680,826, filed December 15, 1923, now Patent Number 1,687,981 granted October 16, 1928.

The primary object of the present invention resides in the provision of a novel loading fixture which is operable to locate or center one or more work blanks in a workholder and which is adapted to hold the workholder securely in position while the work is being clamped in centered position or is being released.

A more specific object is to provide a novel loading fixture which is adapted to support a portable workholder having one or more work blanks mounted therein with bores or internal surfaces to be machined which is adapted to simultaneously locate said surfaces in said workholder, and which is adapted to hold said workholder securely in position while the work is being clamped after having been centered or being released after having been machined.

Another object is to provide a new and improved loading fixture which is simple and inexpensive in construction, which can be easily and quickly manipulated, and which is efficient and accurate in use.

Further objects and advantages will become apparent from the following description taken in connection with the accompanying drawings in which Figure 1 is an end elevation of a table on which a loading fixture embodying the features of our invention is supported.

Figure 1:
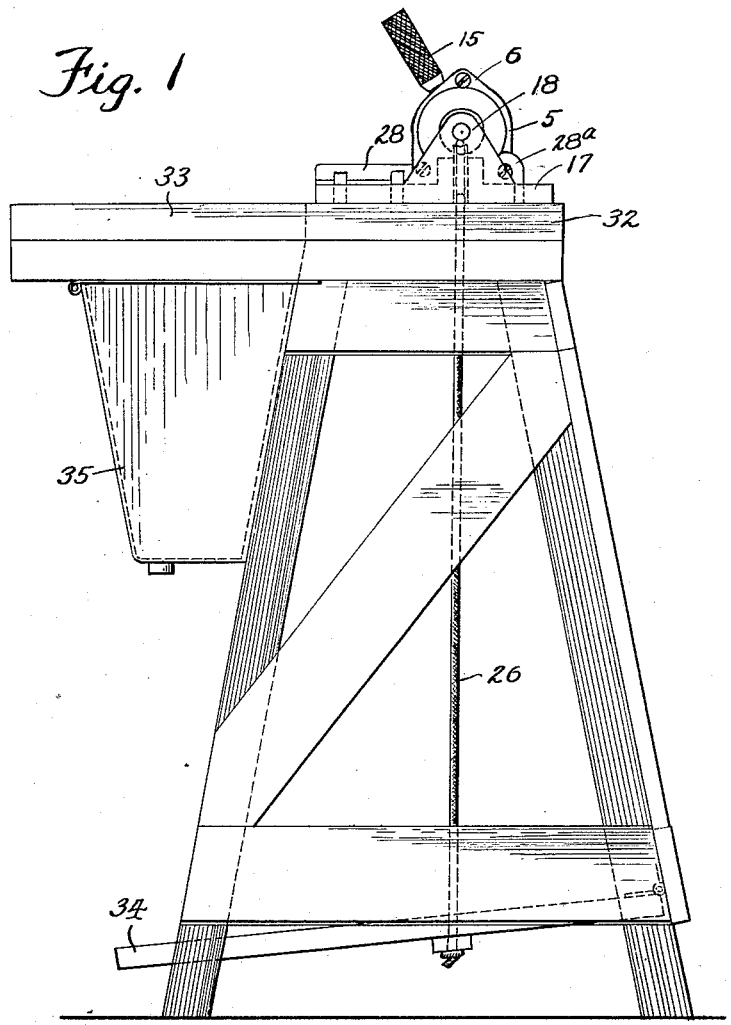

While the invention is susceptible of various modifications and alternative constructions, we have shown in the drawings and will herein describe in detail the preferred embodiment, but it is to be understood that we do not thereby intend to limit the invention to the particular form disclosed, but aim to cover all modifications and alternative constructions falling within the spirit and scope of the invention as expressed in the appended claims.

While loading fixtures embodying the features of our invention may serve many different kinds of work holders for a large variety of work, we have, for purposes of illustration, shown a portable work holder in which two work blanks A having bores $a$ to be ground, are mounted. This work holder or shuttle (see Figs. 3 and 4) comprises a pair of end plates 5 which are preferably formed with V-shaped extensions 6 on their upper ends. A plurality of spacers 7 rigidly connect the upper and lower corners of the plates to hold them in parallel spaced relation. Alined central openings 8 are formed in the end plates. One end plate 5 is formed with an annular centering notch 9 for positioning the work holder within the chuck (not shown) with the openings 8 concentrically positioned with respect to the axis of rotation.

Figure 3:
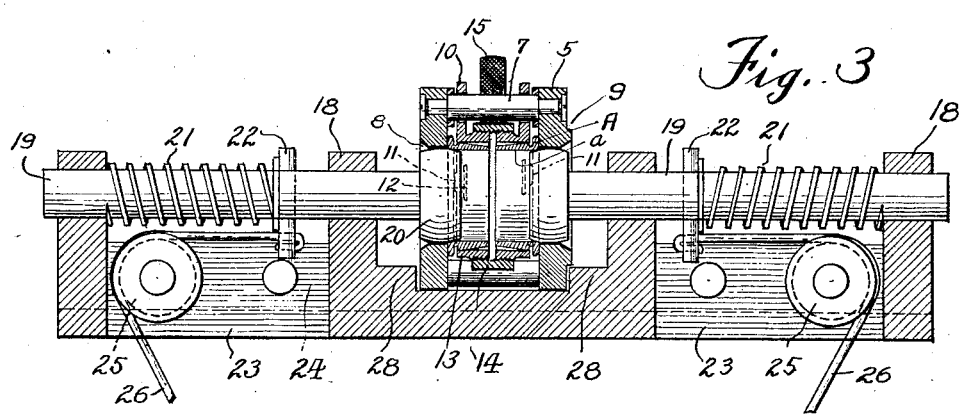
Fig. 3 is a sectional view of the loading fixture taken along line 3—3 of Fig. 2, and of a workholder mounted in position on said fixture.

Loosely mounted on the upper spacer 7 are two clamping rings 10 for clamping the work blanks A against the inner faces of the end plates 5. A plurality of uniformly spaced projections 11 are formed on the outer edges of the clamping rings 10 to engage the work blanks, and are backed up by elongated slots 12 in the peripheral walls of the clamping rings to provide resiliency. The clamping rings 10 are provided with inwardly extending annular flanges 13 on which are formed right and left hand screw threads respectively. An adjusting nut or ring 14 having right and left hand screw threads in its opposite ends engages the flanges 13. The workholder shown in Fig. 3 is provided with a handle 15 for adjusting the ring 14 to simultaneously move the clamping rings 10 toward and from their respective end plates. In the shuttle shown in Fig. 4, the ring 14 is formed with peripheral gear teeth 16 which are adapted to mesh with a gear member for adjusting the ring.

The loading device comprises a base plate 17 which is formed with a plurality of upstanding V-shaped standards 18 in which two alined rods 19 are reciprocably mounted. The adjacent inner ends of the rods are provided with centering plugs 20 which are adapted to be positioned in alinement with the bores or openings 8 when the workholder is mounted on the plate 17, and which are adapted to be moved into and out of engagement with the bores $a$ of the work blanks A to center the latter in the workholder. These centering plugs may have any suitable or desired form to suit the character of the work. In the present instance the contacting surface of each of the centering plugs 20 is formed in the shape of a sphere zone having a maximum diameter slightly greater than that of the bore of the work and substantially equal to though smaller than that of the openings 8. The purpose of making the centering plugs 20 in the form of spherical zones is to eliminate the necessity of exactly positioning the shuttle on the fixture. While the shuttle is very nearly exactly positioned, nevertheless a slight amount of error is permissible, because the equators of the zones contact the interior surfaces of the openings 8. In other words, the centering plugs are tangent to the openings, touching them on the line of a great circle of the zones, and in this way the cylindrical openings 8 are caused to lie in axial alinement with the axes of the centering plugs. The axes of the workpieces are also caused to coincide with the axes of the centering plugs because a small circle of the zones will contact with the orifices of the workpieces as will be readily apparent.

Positioned on the rods 19 are two coiled springs 21. The outer ends of the springs 21 abut against the inner faces of the end standards 18, and the inner ends thereof abut against vertical pins 22 extending through the rods. The springs tend to move the centering plugs 20 toward each other.

Two elongated slots 23 open through the base plate 17, one directly below each rod 19 and between the two supporting standards 18 therefor. Two pairs of spaced upstanding walls 24 which constitute continuations of the sides of the slots 23 connect the standards 18 on each end of the base plate. Mounted between the outer ends of each pair of walls 24 is a sheave 25. Flexible cords or cables 26 pass inwardly over the sheaves 25 and are connected to the lower ends of the pins 22 for moving the centering plugs 20 apart.

The central portion of the base plate 17 between the inner standards 18 is formed with a raised surface 27 and with a pair of parallel guides 28 on opposite sides of the surface for positioning the shuttle or work handle between the centering plugs. A hook 28ª secured to the plate 17 at the rear of the surface 27 extends forwardly over the surface to engage the rear spacer 7 of the shuttle or workholder when the latter is in position.

Figure 2:
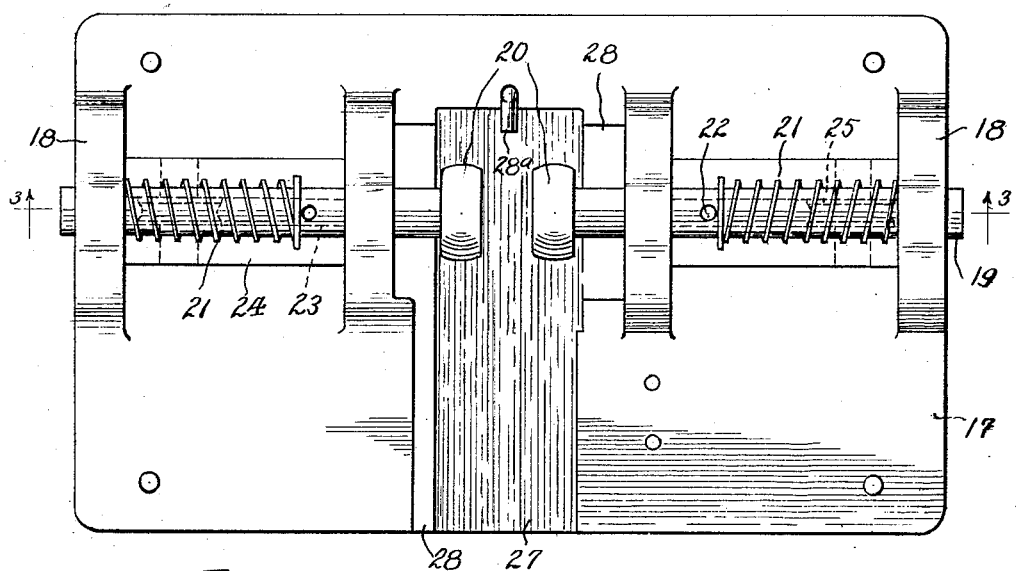
Fig. 2 is a plan view of the loading fixture.

The construction shown in Figs. 1 to 3 inclusive and described in the foregoing is fully disclosed in our copending application referred to herein.

Figure 4:
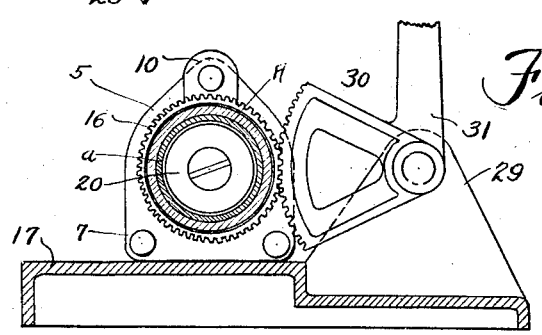
Fig. 4 is a transverse sectional view of a modified form of loading fixture having a workholder mounted thereon.

In the modified form shown in Fig. 4, the hook 28ª is dispensed with. An upstanding bearing bracket 29 is formed on the rear edge of the base plate 17 centrally of the side standards 18. Pivotally mounted on the bracket 29 is a gear segment 30 adapted to mesh with the gear teeth 16 on the ring 14 of the workholder. This gear segment 30 is provided with an operating handle 31.

While any other suitable support may be employed, we have shown the centering device mounted on a table 32 having a forwardly extending work shelf 33 (see Figure 1). A foot treadle 34 is pivoted at its rear end to the lower portion of the table frame, and is centrally connected with the lower end of the cords 26. Preferably a receptacle 35 is secured to the table frame directly below the shelf 33. The receptacle 35 is adapted to contain a suitable lubricant in which the finished work blanks may be dipped after being removed from the workholder to clean the blanks and to facilitate the final manual gaging of the bores $a$ by the usual plug gage.

In operation, the treadle 34 is depressed, thereby separating the centering plugs 20. A workholder with the work blanks A therein is positioned on the surface 27 of the base plate 17, and the foot treadle is then released, thereby permitting the springs 21 to force the centering plugs 20 into engagement with the bores of the work. The centering plugs serve to center the work blanks in the workholder. After the work blanks are centered, they are clamped by the rings 10 which are actuated by operating either the handle 15 of the shuttle shown in Fig. 3, or the handle 31 of the loading fixture shown in Fig. 4. The treadle is then again depressed, and the loaded holder is removed.

To unload the workholder, it is positioned on the loading fixture, and is clamped in place thereon by the centering plugs. The adjusting ring 14 is then rotated to loosen the clamping rings 10.

It will be seen that we have provided a highly advantageous means for quickly and accurately centering and clamping work pieces in portable workholders. The device is simple and inexpensive in construction, can be easily and quickly operated, and serves to automatically center the work.

We claim as our invention:

1. A device for facilitating the loading of work holders for machine tools comprising, in combination, a base, means on said base for positioning the work holder, a plurality of upstanding standards on said base, a pair of alined members reciprocably mounted in said standards, centering devices provided on adjacent ends of said members and adapted to engage the work holder and the work therein to center the latter when the work holder is mounted in position, and means for reciprocating said members.

2. A device for facilitating the loading of a portable work holding device comprising, in combination, a pair of opposed centering plugs, means supporting said plugs in axial alinement, a support for the workholding device to permit it to be placed between the plugs, means for moving said plugs apart to permit of the insertion or removal of said work holding device, and spring means for moving said plugs toward each other to center the work blanks in said work holding device.

3. A device for facilitating the loading of work holders comprising, in combination, a base, fixed means on said base for positioning the work holder, a centering device movably mounted on said base for movement into and out of engagement with the work holder and the work therein, said device serving to center the work in the work holder, and means for actuating said device.

4. A device for facilitating the loading of work holders comprising, in combination, a base adapted to support the work holder, a centering means mounted on said base and adapted to center the work in said holder, and means on said base for actuating the work holder to clamp the work in centered position or to release the work.

5. A device for facilitating the loading of a workholder comprising, in combination, a base, a guideway on said base adapted to receive and position the workholder laterally, means movably mounted on said base for centering the work in the workholder, means for actuating said last mentioned means, a gear segment pivotally mounted at one end of said guideway and adapted to mesh with a part of the workholder, and means for actuating said gear segment to adjust said workholder to clamp or release the work, said first mentioned means being adapted to hold the work in centered position in the workholder while it is being clamped.

6. A device for facilitating the loading of a portable workholder comprising, in combination, a base, a central guideway formed on said base on which the workholder is adapted to be positioned, said guideway having guides adapted to engage the ends of the workholder to locate the latter laterally of said guideway, means for locating the workholder on the guideway longitudinally thereof, two pairs of upstanding aligned spaced standards one pair at each side of said guideway, a pair of rods one slidably mounted in the standards at each side of said guideway, two centering elements one on the inner end of each rod, said centering elements being adapted to position the work in the workholder, spring means tending to move said centering elements toward the workholder, a pair of longitudinal slots one underlying each rod, a pair of sheaves one rotatably mounted in the outer end of each slot, and two cords one passing over each sheave and being connected to the rod overlying the latter for moving said rod against the force of said spring means.

7. A device for facilitating the loading of a work holder comprising, a guideway by means of which the work holder may be pushed into position, a pair of supports mounted on either side of said guideway at the point where the work holder is in work loading position, a pair of members having spherical zone surfaces, and slidable means mounted in the aforesaid supports allowing the members to be moved in a direction perpendicular to the ways of the guideway toward and from each other but always in axial alinement, whereby the work holder itself may be positioned in exact axial alinement with the axes of the zones by tangent contact therewith and, as said members having zone surfaces are caused to approach each other, a workpiece in the work holder will likewise be axially alined with the members having zone surfaces by contact of a small circle of said zone with the orifice of the workpiece.

In testimony whereof we have hereunto affixed our signatures.

HERBERT E. KEMPTON.
KEITH F. GALLIMORE.